(12) United States Patent
Wang et al.

(10) Patent No.: US 9,497,671 B2
(45) Date of Patent: *Nov. 15, 2016

(54) METHOD AND APPARATUS FOR PERFORMING A HANDOVER IN AN EVOLVED UNIVERSAL TERRESTRIAL RADIO ACCESS NETWORK

(71) Applicant: INTERDIGITAL PATENT HOLDINGS, INC., Wilmington, DE (US)

(72) Inventors: Peter S. Wang, E. Setauket, NY (US); Guodong Zhang, Syosset, NY (US); Jin Wang, Princeton, NJ (US); Mohammed Sammour, Amman (JO); Shankar Somasundaram, Sunnyvale, CA (US); Stephen E. Terry, Northport, NY (US); Ulises Olvera-Hernandez, Kirkland (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/664,829

(22) Filed: Mar. 21, 2015

(65) Prior Publication Data

US 2015/0201356 A1 Jul. 16, 2015

Related U.S. Application Data

(63) Continuation of application No. 13/670,657, filed on Nov. 7, 2012, now Pat. No. 8,989,143, which is a continuation of application No. 12/492,469, filed on Jun. 26, 2009, now Pat. No. 8,331,326.

(60) Provisional application No. 61/076,943, filed on Jun. 30, 2008.

(51) Int. Cl.
*H04W 36/00* (2009.01)
*H04J 11/00* (2006.01)
*H04W 74/08* (2009.01)

(52) U.S. Cl.
CPC ...... *H04W 36/0061* (2013.01); *H04J 11/0069* (2013.01); *H04W 36/0055* (2013.01); *H04W 74/0833* (2013.01)

(58) Field of Classification Search
USPC ................ 370/310–350, 436–437, 439, 442
See application file for complete search history.

(56) References Cited

U.S. PATENT DOCUMENTS

| 5,872,774 A | 2/1999 | Wheatley, III et al. |
| 7,003,303 B2 | 2/2006 | Khawand et al. |

(Continued)

FOREIGN PATENT DOCUMENTS

| AU | 2010-200888 B2 | 3/2014 |
| CN | 1612635 A | 5/2005 |

(Continued)

OTHER PUBLICATIONS

3rd Generation Partnership Project (3GPP), R2-073992, "Delivery of HO Command", Qualcomm Europe, 3GPP TSG-RAN WG 2 Meeting #59-bis, Shanghai, China, Oct. 8-12, 2007, pp. 1-3.

(Continued)

*Primary Examiner* — Warner Wong
(74) *Attorney, Agent, or Firm* — Condo Roccia Koptiw LLP

(57) ABSTRACT

A method and an apparatus for performing a handover in an evolved universal terrestrial radio access network (E-UTRAN) are disclosed. A wireless transmit/receive unit (WTRU) sends a measurement report to a source evolved Node B (eNB), and receives a handover command from the source eNB. The WTRU initiates reception and processing of a primary broadcast channel (P-BCH) at the target cell after receiving the handover command. The WTRU then sends a random access preamble to the target eNB, receives a random access response from the target eNB, and sends a handover complete message to the target eNB. The reception and processing of the P-BCH may be initiated immediately after receiving the handover command or after sending the handover complete message. The WTRU may apply default configuration or source cell configuration in the target cell until a target cell SFN and/or P-BCH information are acquired.

20 Claims, 5 Drawing Sheets

(56) References Cited

U.S. PATENT DOCUMENTS

| | | |
|---|---|---|
| 7,167,709 B2 | 1/2007 | Schwarz et al. |
| 7,525,941 B2 | 4/2009 | Islam et al. |
| 7,852,805 B2 | 12/2010 | Kahtava et al. |
| 8,107,950 B2 | 1/2012 | Amirijoo et al. |
| 8,131,295 B2 | 3/2012 | Wang et al. |
| 8,169,986 B2 | 5/2012 | Jeong et al. |
| 8,331,326 B2 | 12/2012 | Wang et al. |
| 8,712,415 B2 | 4/2014 | Zhang et al. |
| 2002/0089734 A1 | 7/2002 | Meehan et al. |
| 2003/0016698 A1 | 1/2003 | Chang et al. |
| 2003/0153275 A1 | 8/2003 | Oh et al. |
| 2004/0052229 A1 | 3/2004 | Terry et al. |
| 2004/0082356 A1 | 4/2004 | Walton et al. |
| 2004/0170179 A1 | 9/2004 | Johansson et al. |
| 2004/0174845 A1 | 9/2004 | Koo et al. |
| 2004/0185853 A1 | 9/2004 | Kim et al. |
| 2004/0192320 A1 | 9/2004 | Khawand et al. |
| 2004/0208160 A1 | 10/2004 | Petrovic et al. |
| 2005/0094600 A1 | 5/2005 | Zhang et al. |
| 2005/0096050 A1 | 5/2005 | Hidaka |
| 2005/0282549 A1 | 12/2005 | Kim et al. |
| 2006/0183429 A1 | 8/2006 | Anderson |
| 2006/0209798 A1 | 9/2006 | Oikarinen et al. |
| 2006/0223532 A1 | 10/2006 | Liu et al. |
| 2006/0252377 A1 | 11/2006 | Jeong et al. |
| 2006/0261600 A1 | 11/2006 | Lee |
| 2007/0047493 A1 | 3/2007 | Park et al. |
| 2007/0189205 A1 | 8/2007 | Terry et al. |
| 2008/0026759 A1 | 1/2008 | Sawamoto |
| 2008/0070611 A1 | 3/2008 | Yi et al. |
| 2008/0072269 A1 | 3/2008 | Malladi et al. |
| 2008/0076405 A1 | 3/2008 | Jen |
| 2008/0102896 A1 | 5/2008 | Wang et al. |
| 2008/0227453 A1 | 9/2008 | Somasundaram et al. |
| 2008/0232304 A1 | 9/2008 | Mooney et al. |
| 2008/0242292 A1 | 10/2008 | Koskela et al. |
| 2008/0254800 A1 | 10/2008 | Chun et al. |
| 2008/0261600 A1 | 10/2008 | Somasundaram et al. |
| 2008/0267131 A1 | 10/2008 | Kangude et al. |
| 2008/0285539 A1 | 11/2008 | Tiedemann, Jr. et al. |
| 2009/0005042 A1* | 1/2009 | Bi .................. H04W 48/10 455/436 |
| 2009/0086676 A1 | 4/2009 | Meylan et al. |
| 2009/0129335 A1 | 5/2009 | Lee et al. |
| 2009/0168728 A1 | 7/2009 | Pani et al. |
| 2009/0238141 A1 | 9/2009 | Damnjanovic et al. |
| 2009/0239539 A1 | 9/2009 | Zhang et al. |
| 2009/0247161 A1 | 10/2009 | Pani et al. |
| 2009/0274086 A1 | 11/2009 | Petrovic et al. |
| 2009/0309921 A1 | 12/2009 | Ohyama et al. |
| 2010/0027466 A1 | 2/2010 | Mustapha |
| 2010/0113033 A1 | 5/2010 | Qiu et al. |
| 2010/0182974 A1 | 7/2010 | Barraclough et al. |
| 2010/0202402 A1 | 8/2010 | Dalsgaard et al. |
| 2010/0210255 A1 | 8/2010 | Amirijoo et al. |
| 2010/0238799 A1 | 9/2010 | Sebire |
| 2010/0279695 A1 | 11/2010 | Amirijoo et al. |
| 2012/0064897 A1 | 3/2012 | Amirijoo et al. |
| 2012/0213157 A1 | 8/2012 | Jeong et al. |
| 2013/0064224 A1 | 3/2013 | Wang et al. |

FOREIGN PATENT DOCUMENTS

| | | |
|---|---|---|
| CN | 1984452 A | 6/2007 |
| CN | 101069448 A | 11/2007 |
| CN | 101183920 A | 5/2008 |
| EP | 0568212 B1 | 9/1997 |
| EP | 1058417 A2 | 12/2000 |
| EP | 1058471 A2 | 12/2000 |
| EP | 1117269 A1 | 7/2001 |
| EP | 1199904 A1 | 4/2002 |
| EP | 1408658 A2 | 4/2004 |
| EP | 1799003 A1 | 6/2007 |
| EP | 1909520 A1 | 4/2008 |
| EP | 1909523 A1 | 4/2008 |
| EP | 1915010 A2 | 4/2008 |
| GB | 2353671 A | 2/2001 |
| IL | 194081 | 6/2009 |
| JP | 10-23501 A | 1/1998 |
| JP | 2003-523138 A | 7/2003 |
| JP | 2005-529358 A | 10/2005 |
| JP | 2005-539468 A | 12/2005 |
| JP | 2006-504335 A | 2/2006 |
| JP | 2006-515484 A | 5/2006 |
| JP | 2007-503740 A | 2/2007 |
| JP | 2009-509431 A | 3/2009 |
| JP | 2009-519636 A | 5/2009 |
| JP | 2010-023501 A | 2/2010 |
| JP | 2010-506445 A | 2/2010 |
| JP | 2011-515958 A | 5/2011 |
| JP | 5023150 B2 | 9/2012 |
| KR | 10-2005-0116497 A | 12/2005 |
| RU | 2003-122285 A | 2/2005 |
| RU | 2292669 C2 | 1/2007 |
| RU | 2305900 C2 | 9/2007 |
| TW | 2004-02978 A | 2/2004 |
| TW | M340666 U | 9/2008 |
| WO | WO 01/60017 A1 | 8/2001 |
| WO | WO 01/72081 A1 | 9/2001 |
| WO | WO 01/76304 A1 | 10/2001 |
| WO | WO 03/043237 A1 | 5/2003 |
| WO | WO 2004/079948 A1 | 9/2004 |
| WO | WO 2004/080102 A1 | 9/2004 |
| WO | WO 2005/006596 A1 | 1/2005 |
| WO | WO 2005/020617 A1 | 3/2005 |
| WO | WO 2005/022814 A1 | 3/2005 |
| WO | WO 2005/032199 A1 | 4/2005 |
| WO | WO 2005/120183 A2 | 12/2005 |
| WO | WO 2005/122704 A2 | 12/2005 |
| WO | WO 2006/061671 A1 | 6/2006 |
| WO | WO 2006/073225 A2 | 7/2006 |
| WO | WO 2007/038994 A2 | 4/2007 |
| WO | WO 2007/066882 A1 | 6/2007 |
| WO | WO 2007/068304 A1 | 6/2007 |
| WO | WO 2007/108959 A1 | 9/2007 |
| WO | WO 2007/144760 A2 | 12/2007 |
| WO | WO 2007/149509 A2 | 12/2007 |
| WO | WO 2008/023927 A2 | 2/2008 |
| WO | WO 2008/040447 A1 | 4/2008 |

OTHER PUBLICATIONS

3rd Generation Partnership Project (3GPP), R1-060773, "Text Proposal of Prioritizing Non-Synchronized Random Access in E-UTRA Uplink", ITRI, 3GPP TSG RAN WG1 Meeting #44bis, Athens, Greece, Mar. 27-31, 2006, 6 pages.

3rd Generation Partnership Project (3GPP), R1-072648, "LS on LTE Latency Analysis", RAN WG2, 3GPP TSG RAN WG1 Meeting #49bis, Orlando, USA, Jun. 25-29, 2007, 10 pages.

3rd Generation Partnership Project (3GPP), R2-082948, "SIB Reading after Handover", Panasonic, 3GPP TSG RAN WG2 RRC Ad Hoc, Sophia-Antipolis, France, Jun. 5-6, 2008, 4 pages.

3rd Generation Partnership Project (3GPP), R2-052787, "Channels for Random Access", CATT, 3GPP TSG RAN WG2 Meeting #49, Seoul, Korea, Nov. 7-11, 2005, pp. 1-2.

3rd Generation Partnership Project (3GPP), R2-060078, "Handover Procedure for LTE_ACTIVE UEs", Samsung, 3GPP TSG-RAN WG2 #50 Meeting, Sophia-Antipolis, France, Jan. 9-13, 2006, pp. 6-14.

3rd Generation Partnership Project (3GPP), R2-060095, "Real-Time Services Handover Support within E-UTRAN", Huawei, 3GPP TSG RAN2 #50, Sophia-Antipolis, France, Jan. 9-13, 2006, pp. 1-4.

3rd Generation Partnership Project (3GPP), R2-060821, "RACH Message Structure", Nokia, Joint 3GPP TSG-RAN WG1 & WG2 Meeting on LTE, Athens, Greece, Mar. 27-31, 2006, 2 pages.

3rd Generation Partnership Project (3GPP), R2-061135, "Intra-LTE Handover Operation", Nokia, NTT DoCoMo, 3GPP TSG-RAN WG2 Meeting #53, Shanghai, PRC, May 8-13, 2006, 3 pages.

(56) References Cited

OTHER PUBLICATIONS

3rd Generation Partnership Project (3GPP), R2-061199, "Discussion on eNode B Change Procedure", Qualcomm Europe, 3GPP TSG-RAN WG 2 Meeting #53, Shanghai, China, May 8-12, 2006, pp. 1-7.
3rd Generation Partnership Project (3GPP), R2-061928, "RRC Re-Establishment Procedure", NTT DoCoMo, 3GPP TSG-RAN WG2 Ad-Hoc on LTE, Cannes, France, Jun. 27-30, 2006, 6 pages.
3rd Generation Partnership Project (3GPP), R2-062809, "Non-Contention based Handover Procedure on RACH Channel", ZTE, TSG-RAN Working Group 2 Meeting #55, Seoul, Korea, Oct. 9-13, 2006, 4 pages.
3rd Generation Partnership Project (3GPP), R2-070167, "Neighboring Cell Information", Samsung, 3GPP TSG-RAN WG2 Meeting #56bis, Sorrento, Italy, Jan. 15-19, 2007, 3 pages.
3rd Generation Partnership Project (3GPP), R2-070646, "Contention-Free Intra-LTE Handover", IPWireless, 3GPP TSG RAN WG2 #57, St. Louis, Missouri, USA, Feb. 12-16, 2007, pp. 1-4.
3rd Generation Partnership Project (3GPP), R2-071229, "Radio Link Failure and Context Recovery", Nokia, 3GPP TSG-RAN WG2 Meeting #57bis, St. Julian's, Malta, Mar. 26-30, 2007, 3 pages.
3rd Generation Partnership Project (3GPP), R2-071359, "Radio Link Failure", Ericsson, 3GPP TSG-RAN WG2 #57bis, St Julian, Malta, Mar. 26-30, 2007, pp. 1-4.
3rd Generation Partnership Project (3GPP), R2-072193, "LS on LTE Latency Analysis", RAN WG2, 3GPP TSG-RAN WG2 Meeting #58, Kobe, Japan, May 7-11, 2007, 12 pages.
3rd Generation Partnership Project (3GPP), R2-082903, "Miscellaneous Clarifications/Corrections", Rapporteur (Samsung), 3GPP TSG-RAN2#62 Meeting, Kansas City, U.S.A, May 5-9, 2008, 177 pages.
3rd Generation Partnership Project (3GPP), R2-082982, "Measurement Related Actions during Handover", Huawei, 3GPP TSG RAN WG2-RRC Ad-Hoc, Sophia-Antipolis, France, Jun. 5-6, 2008, 4 pages.
3rd Generation Partnership Project (3GPP), R3-060009, "The Handover Procedure for the LTE_ACTIVE Mobility", Panasonic, TSG-RAN Working Group 3 Meeting #50, Sophia-Antipolis, France, Jan. 10-12, 2006, 4 pages.
3rd Generation Partnership Project (3GPP), TR R3.018 V0.4.0, "Technical Specification Group Radio Access Network, Evolved UTRA and UTRAN, Radio Access Architecture and Interfaces (Release 7)", May 2006, pp. 1-51.
3rd Generation Partnership Project (3GPP), TR 25.912 V0.1.4, "Technical Specification Group Radio Access Network, Feasibility Study for Evolved UTRA and UTRAN (Release 7)", May 2006, pp. 1-38.
3rd Generation Partnership Project (3GPP), TR 25.912 V0.1.7, "Technical Specification Group Radio Access Network, Feasibility Study for Evolved UTRA and UTRAN (Release 7)", Jun. 2006, pp. 1-64.
3rd Generation Partnership Project (3GPP), TR 25.912 V0.2.0, "Technical Specification Group Radio Access Network, Feasibility Study for Evolved UTRA and UTRAN (Release 7)", Jun. 2006, pp. 1-57.
3rd Generation Partnership Project (3GPP), TR 25.912 V7.1.0, "Technical Specification Group Radio Access Network, Feasibility Study for Evolved Universal Terrestrial Radio Access (UTRA) and Universal Terrestrial Radio Access Network (UTRAN) (Release 7)", Sep. 2009, pp. 1-57.
3rd Generation Partnership Project (3GPP), TS 25.331 V6.9.0, "Technical Specification Group Radio Access Network, Radio Resource Control (RRC), Protocol Specification (Release 6)", Mar. 2006, pp. 1-1209.
3rd Generation Partnership Project (3GPP), TS 25.331 V8.0.0, "Technical Specification Group Radio Access Network, Radio Resource Control (RRC), Protocol Specification (Release 8)", Sep. 2007, pp. 1-1460.
3rd Generation Partnership Project (3GPP), TS 36.300 V8.0.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 8)", Mar. 2007, pp. 1-82.
3rd Generation Partnership Project (3GPP), TS 36.300 V8.4.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 8)", Mar. 2008, pp. 1-126.
3rd Generation Partnership Project (3GPP), TS 36.300 V8.5.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 8)", May 2008, pp. 1-134.
3rd Generation Partnership Project (3GPP), TS 36.300 V8.8.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 8)", Mar. 2009, pp. 1-157.
3rd Generation Partnership Project (3GPP), TS 36.300 V8.9.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 8)", Jun. 2009, pp. 1-159.
3rd Generation Partnership Project (3GPP), TS 36.300 V9.0.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 8)", Jun. 2009, pp. 1-157.
3rd Generation Partnership Project (3GPP), TS 36.331 V8.1.0, "Technical Specification Group Radio Access Network, Evolved Universal Terrestrial Radio Access (E-UTRA) Radio Resource Control (RRC), Protocol Specification (Release 8)", Mar. 2008, pp. 1-122.
3rd Generation Partnership Project (3GPP), TS 36.331 V8.2.0, "Technical Specification Group Radio Access Network, Evolved Universal Terrestrial Radio Access (E-UTRA) Radio Resource Control (RRC), Protocol Specification (Release 8)", May 2008, pp. 1-151.
3rd Generation Partnership Project (3GPP), TS 36.331 V8.4.0, "Technical Specification Group Radio Access Network, Evolved Universal Terrestrial Radio Access (E-UTRA) Radio Resource Control (RRC), Protocol Specification (Release 8)", Dec. 2008, pp. 1-198.
3rd Generation Partnership Project (3GPP), TS 36.331 V8.5.0, "Technical Specification Group Radio Access Network, Evolved Universal Terrestrial Radio Access (E-UTRA) Radio Resource Control (RRC), Protocol Specification (Release 8)", Mar. 2009, pp. 1-204.
3rd Generation Partnership Project (3GPP), TS 36.331 V8.6.0, "Technical Specification Group Radio Access Network, Evolved Universal Terrestrial Radio Access (E-UTRA) Radio Resource Control (RRC), Protocol Specification (Release 8)", Jun. 2009, pp. 1-207.
European Telecommunications Standards Institute (ETSI), TS 136 300 V8.0.0, "Universal Mobile Telecommunications System (UMTS), Evolved Universal Terrestrial Radio Access (E-UTRA) and Evolved Universal Terrestrial Radio Access (E-UTRAN), Overall Description, Stage 2 (3GPP TS 36.300 Version 8.0.0 Release 8)", Mar. 2007, pp. 1-84.
3rd Generation Partnership Project (3GPP), R2-074312, "Need to Obtain the Target SFN Prior to HO", LG Electronics, 3GPP TSG-RAN#59bis WG 2 LTE, Shanghai, China, Oct. 8-12, 2007, 2 pages.
European Telecommunications Standards Institute (ETSI), TS 136 300 V8.4.0, "Evolved Universal Terrestrial Radio Access (E-UTRA) and Evolved Universal Terrestrial Radio Access (E-UTRAN), Overall Description, Stage 2 (3GPP TS 36.300 Version 8.4.0 Release 8)", Apr. 2008, 5 pages.
Koodli et al., "A Context Transfer Protocol for Seamless Mobility", Communication Systems Laboratory, Nokia Research Center, Seamoby Working Group, Aug. 30, 2002, pp. 1-35.

(56) References Cited

OTHER PUBLICATIONS

3rd Generation Partnership Project (3GPP), TS 25.331 V6.7.0, "Technical Specification Group Radio Access Network, Radio Resource Control (RRC), Protocol Specification (Release 6)", Sep. 2005, pp. Jan. 1-1166.

3rd Generation Partnership Project (3GPP), R2-061552, "Discussion on Initial Access to LTE Cell", LG Electronics, TSG-RAN Working Group 2 #53, Shanghai, China, May 8-12, 2006, 6 pages.

3$^{rd}$ Generation Partnership Project (3GPP), R2-080319, "CQI reporting resource handling and signaling", Panasonic, 3GPP TSG RAN WG2, Meeting # 60 bis, Seville, Spain, Jan. 2008, 6 pages.

3$^{rd}$ Generation Partnership Project (3GPP), R2-080474, "Response to RAN2 LS on SFN Reading from the Target Cell at HO (R2-074590)", TSG RAN WG1, 3GPP TSG RAN WG2, Meeting # 60 bis, Seville, Spain, Jan. 2008, 2 pages.

3$^{rd}$ Generation Partnership Project (3GPP), R2-080552, "Stage 3 Description of DRX", Nokia Corporation, Nokia Siemens Networks, 3GPP TSG-RAN WG2, Meeting # 60 bis, Seville, Spain, Jan. 2008, 8 pages.

3$^{rd}$ Generation Partnership Project (3GPP), R2-080742, "SFN reading during handover", ZTE, 3GPP TSG RAN WG2, Meeting # 61, Feb. 2008, Sorrento, Italy, 1 page.

3rd Generation Partnership Project (3GPP), R2-071968, "P-BCH Transmission Interval in LTE", NTT DoCoMo, Inc., NEC, 3GPP TSG-RAN WG2 #58, Kobe, Japan, May 7-11, 2007, 5 pages.

\* cited by examiner

METHOD AND APPARATUS FOR PERFORMING A HANDOVER IN AN EVOLVED UNIVERSAL TERRESTRIAL RADIO ACCESS NETWORK

CROSS REFERENCE TO RELATED APPLICATIONS

This application is a continuation of U.S. patent application Ser. No. 13/670,657, filed Nov. 7, 2012, which is issuing as U.S. Pat. No. 8,989,143 on Mar. 24, 2015, which is a continuation of U.S. patent application Ser. No. 12/492,469, filed Jun. 26, 2009, which issued as U.S. Pat. No. 8,331,326 on Dec. 11, 2012, which claims the benefit of U.S. Provisional Application No. 61/076,943 filed Jun. 30, 2008, the contents of all of which are incorporated by reference as if fully set forth herein in their respective entirety, for all purposes.

FIELD OF INVENTION

This application is related to wireless communications.

BACKGROUND

A handover is a process of transferring an ongoing call or data session from one cell to another. Conventionally, a wireless transmit/receive unit (WTRU) assisted network controlled handover is implemented such that a WTRU measures a signal strength of neighboring cells and a serving cell and sends a measurement report to the network. The network then determines whether to perform the handover to another cell, (i.e., a target cell).

FIG. 1 is a signaling diagram of a handover process 100 in the third generation partnership project (3GPP) long term evolution (LTE) network (intra-mobility management entity (MME)/serving gateway handover procedure). The source evolved Node-B (eNB) configures the WTRU measurement procedures according to the area restriction information (step 102). The WTRU sends a measurement report in accordance with the rules set by system information, specification, etc. (step 104). The source eNB makes a handover decision based on the measurement report (step 106). The source eNB issues a handover request message to a target eNB passing necessary information to prepare the handover at the target eNB (step 108). Admission control may be performed by the target eNB (step 110). Once the target eNB decides to admit the WTRU, the target eNB prepares handover with L1/L2 and sends a handover request acknowledgement message to the source eNB (step 112). The handover request acknowledgement message includes a transparent container to be sent to the WTRU as a radio resource control (RRC) message. The source eNB sends a handover command to the WTRU (step 114).

Upon receipt of the handover command, the WTRU detaches from the source cell and synchronizes to the target cell and accesses the target cell via an RACH following a contention-free procedure if a dedicated RACH preamble was indicated in the handover command or following a contention-based RACH procedure if no dedicated RACH preamble was indicated in the handover command (step 116). The target eNB sends a random access response with uplink allocation and timing advance value for the WTRU (step 118). The WTRU then sends a handover complete message to the target eNB (step 120). A normal operation starts between the WTRU and the target eNB thereafter.

A WTRU needs to know a system frame number (SFN) after handover for its normal operation in the target cell. Especially, both discontinuous reception (DRX) and reception of dynamic broadcast channel (D-BCH) require the WTRU to have the knowledge of SFN. Therefore, an efficient method would be desirable to handle SFN during and after handover.

SUMMARY

A method and an apparatus for performing a handover in an evolved universal terrestrial radio access network (E-UTRAN) are disclosed. A WTRU sends a measurement report to a source eNB, and receives a handover command from the source eNB. The WTRU initiates reception and processing of a primary broadcast channel (P-BCH) at the target cell after receiving the handover command. The WTRU then sends a random access preamble to the target eNB, receives a random access response from the target eNB, and sends a handover complete message to the target eNB. The reception and processing of the P-BCH may be initiated immediately after receiving the handover command or after sending the handover complete message. The WTRU may initiate a radio link recovery procedure on a condition that a target cell system frame number (SFN) is not acquired after a pre-determined period of time. The WTRU may apply default configuration or source cell configuration in the target cell until a target cell SFN and/or P-BCH information are acquired.

BRIEF DESCRIPTION OF THE DRAWINGS

A more detailed understanding may be had from the following description, given by way of example in conjunction with the accompanying drawings wherein.

DETAILED DESCRIPTION

Figure 1:
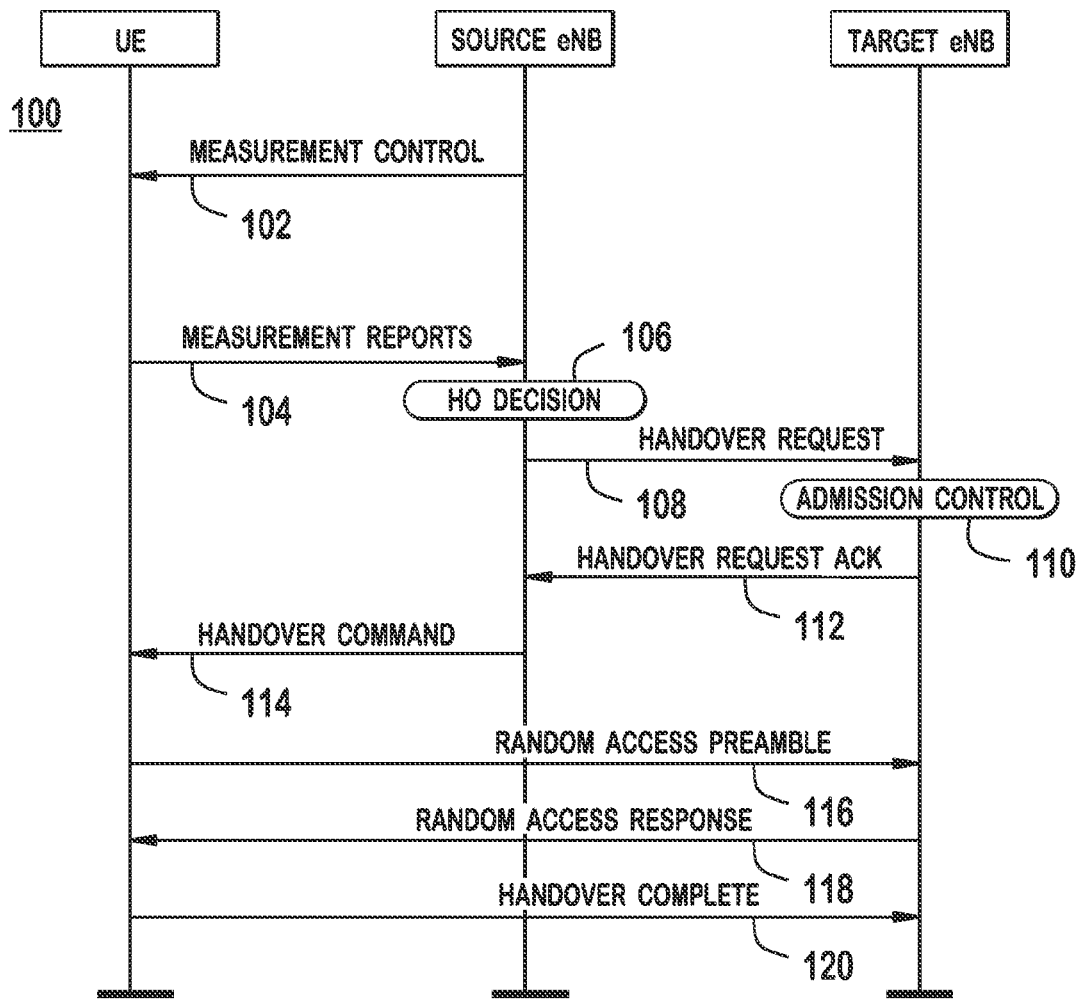
FIG. 1 is a signaling diagram of a handover process in the 3GPP LTE network.

When referred to hereafter, the terminology "WTRU" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "eNB" includes but is not limited to a base station, a Node-B, a site controller, an access point (AP), or any other type of interfacing device capable of operating in a wireless environment.

In accordance with a first embodiment, a new handover command format is defined. The new handover command format reduces the handover interruption time, which is defined as the difference between the time a WTRU receives the handover command and the time the WTRU resumes its uplink and downlink data transmission and reception in the target cell.

In order for the WTRU to perform normal operation (such as data transmission, reception and DRX) in the target cell, the WTRU needs to know cell-specific system information carried on a P-BCH and a D-BCH. However, reading P-BCH (with a transmission time interval (TTI) of 40 ms repeated 4 times) and D-BCH (with scheduling units of 160 and 320 ms) will increase the handover interruption time dramatically. In accordance with the first embodiment, the cell specific system information carried on the P-BCH and the D-BCH in the target cell is included in the handover command. This information may be provided by the target eNB to the source eNB in the handover request acknowledgement message, (e.g., included in the transparent container of the handover request acknowledgement).

The cell-specific system information included in the handover command may be at least one of the following:
(1) Downlink system bandwidth;
(2) Physical control format indicator channel (PCFICH) information;
(3) Physical HARQ indicator channel (PHICH) information, (e.g., PHICH duration and PHICH resource size);
(4) Signaling of reference signal transmit power and power scaling of the reference signal to other data/control subcarriers;
(5) RACH configuration: Information of dedicated preamble reserved for the WTRU in the target cell (validity timer of the dedicated preamble is provided for both synchronous and asynchronous networks) and contention-based RACH information (optional);
(6) Information for uplink reference signals (frequency hopping);
(7) Information for sounding reference signals (location);
(8) Physical uplink control channel (PUCCH) reference signal sequence hopping (same for positive acknowledgement (ACK)/negative acknowledgement (NAK) and/or channel quality indicator (CQI));
(9) Physical uplink shared channel (PUSCH) hopping: semi-static configuration of two hopping modes (inter and intra-sub-frame or inter-sub-frame only hopping) on a cell specific basis;
(10) Uplink power control (cell specific) parameters;
(11) DRX related parameters in the target cell (optional);
(12) Start time of new DRX cycle in the target cell (optional);
(13) System frame number (optional): either full SFN of the target cell or an SFN difference between the source and target cells;
(14) Number of transmit antennas at the target eNB (optional since this may be blindly detected by the WTRU during cell search);
(15) Multimedia broadcast multicast service single frequency network (MBSFN)-related parameters (optional);
(16) Neighboring cells list (optional);
(17) Configuration information for semi-persistent scheduling (SPS) in the target cell;
(18) Uplink and/or downlink persistent scheduling parameters (optional); and
(19) Uplink ACK/NACK resource due to downlink persistent scheduling (optional).

Alternatively, the above cell-specific information, (i.e., handover parameters), may be defined with one or more set of "default" values, and the target eNB may determine which one of the pre-defined sets of values may be used by the WTRU and send only the index to the determined set of default values for a very compact signalling.

Alternatively, a special system information block (SIB) format may be provided for predefined handover parameter values (parameters as defined above) with the scope of one or more public land mobile network (PLMN) (similar to the multiple PLMNs contained in the master information block (MIB) or other SIBs as for the network sharing purpose or just to a particular PLMN), such that the network/service provider, (i.e., the PLMN owner), may predefine the necessary handover values (one or more sets) for the WTRU to acquire before the handover. The eNBs may broadcast such an SIB. The handover command may then pass only the index to the WTRU for the handover parameters to the target eNB.

The WTRU may indicate or report its acquisition of handover parameters from the SIB to the network in one of its uplink messages (such as an RRC reconfiguration complete message or an RRC measurement report message, etc). One bit is enough for this purpose.

The network may decide which way the handover parameter values will be sent to the WTRU in the handover command, either a complete new set of values, an index to the default value set, or an index to a set of the predefined value sets in the SIB broadcast by the eNB.

Figure 2:
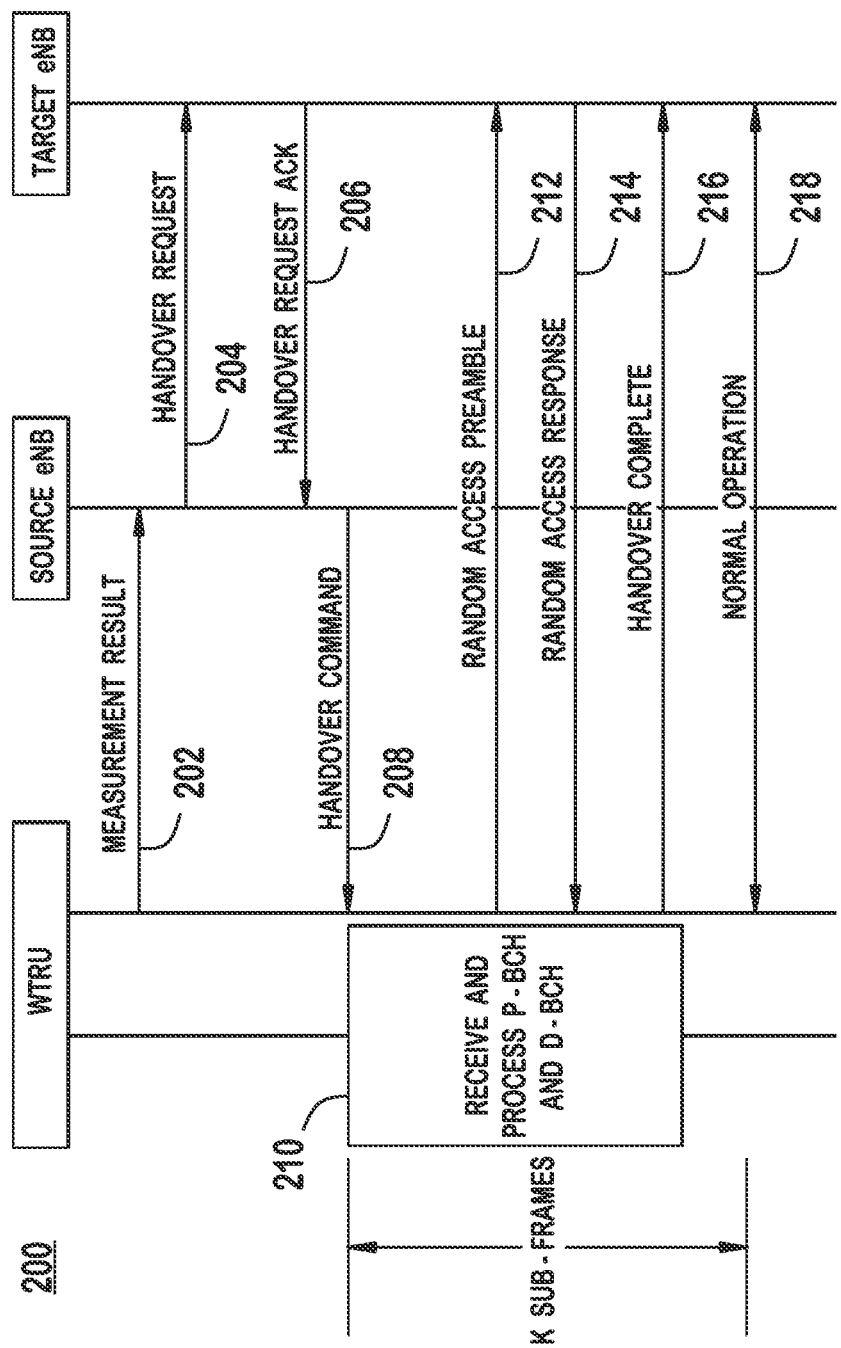
FIG. 2 is a signaling diagram of an example process in accordance with the second embodiment.

In accordance with a second embodiment, a WTRU immediately starts receiving and processing the P-BCH and the D-BCH after receiving the handover command (without SFN information) from the source eNB. FIG. 2 is a signaling diagram of an example process 200 in accordance with the second embodiment. The WTRU sends a measurement report in accordance with the rules set by system information, specification, etc. (step 202). The source eNB makes a handover decision based on the measurement report and issues a handover request message to the target eNB passing necessary information to prepare the handover at the target eNB (step 204). The target eNB decides to admit the WTRU and sends a handover request acknowledgement message to the source eNB (step 206). The handover request acknowledgement message includes a transparent container to be sent to the WTRU as an RRC message. The source eNB sends a handover command to the WTRU (step 208).

After receiving the handover command (without SFN information) from the source eNB, the WTRU immediately starts receiving and processing the P-BCH and the D-BCH (step 210). The WTRU synchronizes to the target cell and sends a random access preamble following a contention-free procedure if a dedicated RACH preamble was indicated in the handover command or following a contention-based RACH procedure if no dedicated RACH preamble was indicated in the handover command (step 212). The reception of P-BCH and D-BCH may start before the WTRU may transmit the RACH access preamble since the WTRU may need to wait for a random access opportunity (1 sub-frame out of 10 or 20 sub-frames). Since the physical resources of the P-BCH and the D-BCH are different than those of eNB message, (i.e., RACH response), during RACH procedure, the WTRU may receive and process both without any problem. The target eNB sends a random access response to the WTRU (step 214). The WTRU then sends a handover complete message to the target eNB (step 216). A normal operation starts between the WTRU and the target eNB thereafter (step 218).

The target eNB may assume that the WTRU already acquired the target cell SFN, P-BCH and D-BCH K sub-frames after the WTRU receives the handover command, and start normal operations for the WTRU. The period of time to acquire the target cell SFN may be less than the P-BCH and D-BCH information. Before that, the normal operations may not be started by the target eNB for the WTRU. These normal operations include, but are not limited to, DRX cycle, L1 feedback, dynamic and semi-persistent data transmission and reception, timing alignment, RACH process, or the like.

The WTRU may provide implicit or explicit signaling to inform the target eNB of when the target cell SFN and/or BCH information is acquired. Alternatively, if the WTRU fails to receive target cell SFN and P-BCH and detect P-BCH timing successfully after K sub-frames, the WTRU may treat it as radio link failure and start radio link recovery procedure.

A default mode of operation may be applied in the target cell until the WTRU acquires target cell SFN and/or BCH information after sending the handover complete message. Generally, the functions, (e.g., DRX), that are affected by not having the target cell SFN and/or other system information on the target cell at the time of handover may be disabled until the target cell information is acquired and applied, or alternatively, may operate as it would have in the source cell and then switch when the target cell information is acquired and applied. For example, DRX operation may be disabled, and L1 feedback may not be generated or may be ignored.

Figure 3:
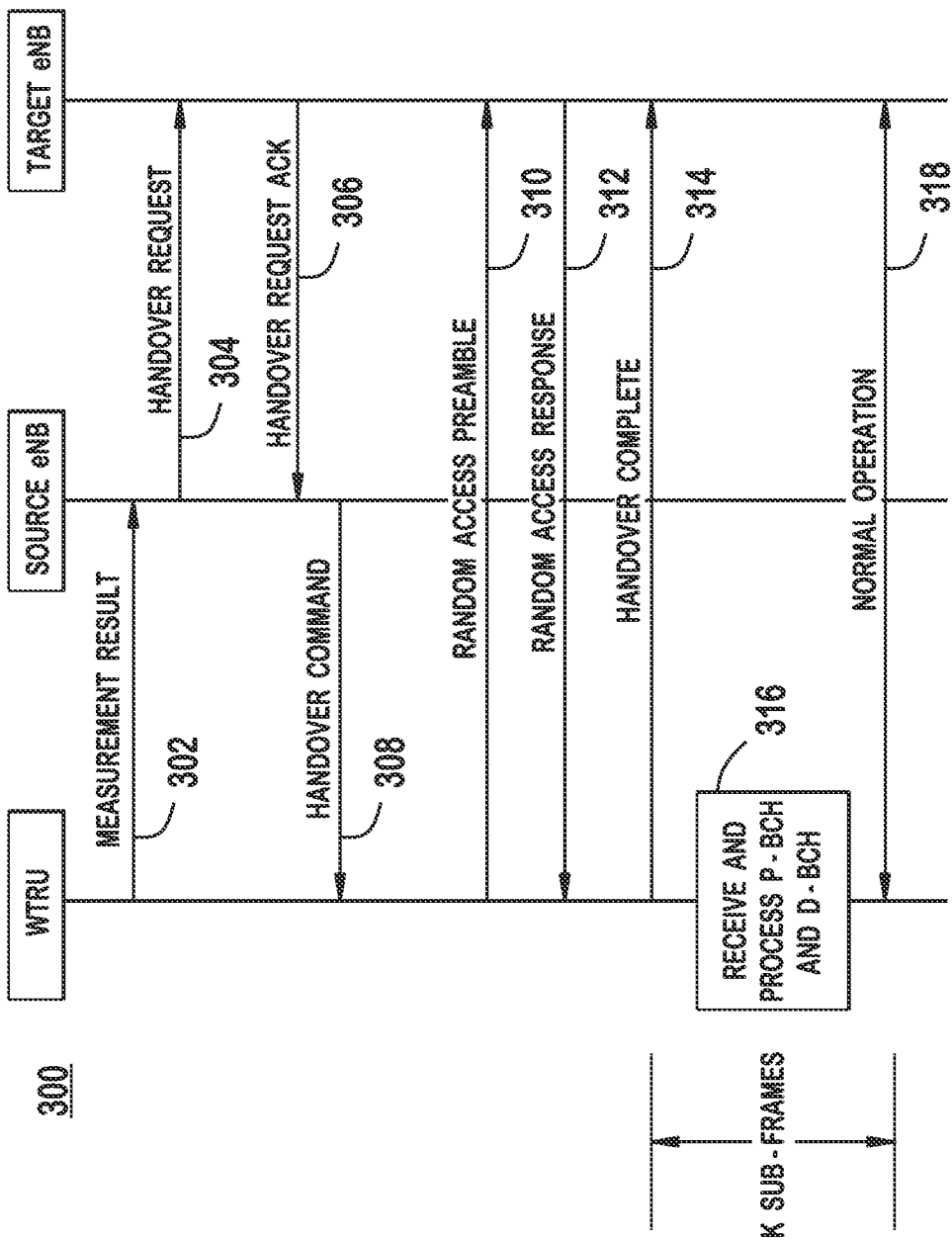
FIG. 3 is a signaling diagram of an example process in accordance with an alternative to the second embodiment.

FIG. 3 is a signaling diagram of an example process 300 in accordance with an alternative to the second embodiment. The WTRU sends a measurement report in accordance with the rules set by system information, specification, etc. (step 302). The source eNB makes a handover decision based on the measurement report and issues a handover request message to the target eNB passing necessary information to prepare the handover at the target eNB (step 304). The target eNB decides to admit the WTRU and sends a handover request acknowledgement message to the source eNB (step 306). The handover request acknowledgement message includes a transparent container to be sent to the WTRU as an RRC message. The source eNB sends a handover command to the WTRU (step 308).

Upon receipt of the handover command, the WTRU detaches from the source cell and synchronizes to the target cell and sends a RACH access preamble to the target eNB following a contention-free procedure if a dedicated RACH preamble was indicated in the handover command or following a contention-based RACH procedure if no dedicated preamble was indicated in the handover command (step 310). The target eNB sends a random access response with uplink allocation and timing advance value for the WTRU (step 312). The WTRU then sends a handover complete message to the target eNB (step 314). After sending the handover complete command to the target eNB, the WTRU may immediately start receiving and processing the P-BCH and the D-BCH on the target cell (step 316). After K sub-frames from the handover complete message, a normal operation may start between the WTRU and the target eNB (step 318).

A default mode of operation may be applied in the target cell until the WTRU acquires target cell SFN and/or BCH information after sending the handover complete message. Generally, the functions, (e.g., DRX), that are affected by not having the target cell SFN and/or other system information on the target cell at the time of handover may be disabled until the target cell information is acquired and applied, or alternatively, may operate as it would have in the source cell and then switch when the target cell information is acquired and applied. For example, DRX operation may be disabled, and L1 feedback may not be generated or may be ignored.

If the DRX related parameters are provided only in the SIB in the target cell, the WTRU may use the DRX parameters from the source cell and continue with DRX operation until the WTRU reads the SFN on the target cell. Alternatively, the WTRU may not apply DRX until the WTRU reads DRX parameters from the system information on the target cell.

If there is no new SFN value when a WTRU enters the target cell, the target eNB may reconfigure the SPS parameters, such as periodicities, HARQ process or radio resources. Alternatively, since an MIB may be received within 16 ms and the interruption may be short, SPS may be disabled until the WTRU gets the SFN information on the target cell.

The WTRU may keep the configuration for DRX and SPS as used in the source cell. The source eNB scheduler may make an implicit or explicit indication of when the WTRU switches to the new configuration to the target eNB. The source eNB may inform the target eNB of the DRX/SPS activity patterns that will be in effect. The target eNB may reject the source cell DRX/SPS activity patterns and have the WTRU de-activate until the target cell system information is acquired.

In accordance with a third embodiment, a WTRU may discard or ignore the source cell configuration, (e.g., SPS and/or DRX configuration such as SPS semiPersistSchedInterval, DRX cycles, etc), upon a medium access control (MAC) reset due to handover. Upon reception of the handover command from the source eNB, the WTRU performs a MAC reset and may discard or ignore the source cell configuration.

Alternatively, the WTRU may keep and continue with the source cell configurations. The WTRU MAC entity may preserve the source cell configuration during the MAC reset. Alternatively, the WTRU MAC entity discards the source cell configuration due to the MAC reset, but the WTRU RRC entity may preserve the source cell configuration and re-configure the MAC entity with the source cell configuration following the handover, (e.g., once or after the MAC reset procedure is completed).

The operations in the target cell, (e.g., SPS and/or DRX operations), may be activated by eNB signaling to the WTRU in the source cell, by eNB signaling to the WTRU in the target cell, or in accordance with a pre-defined rule.

Figure 4:
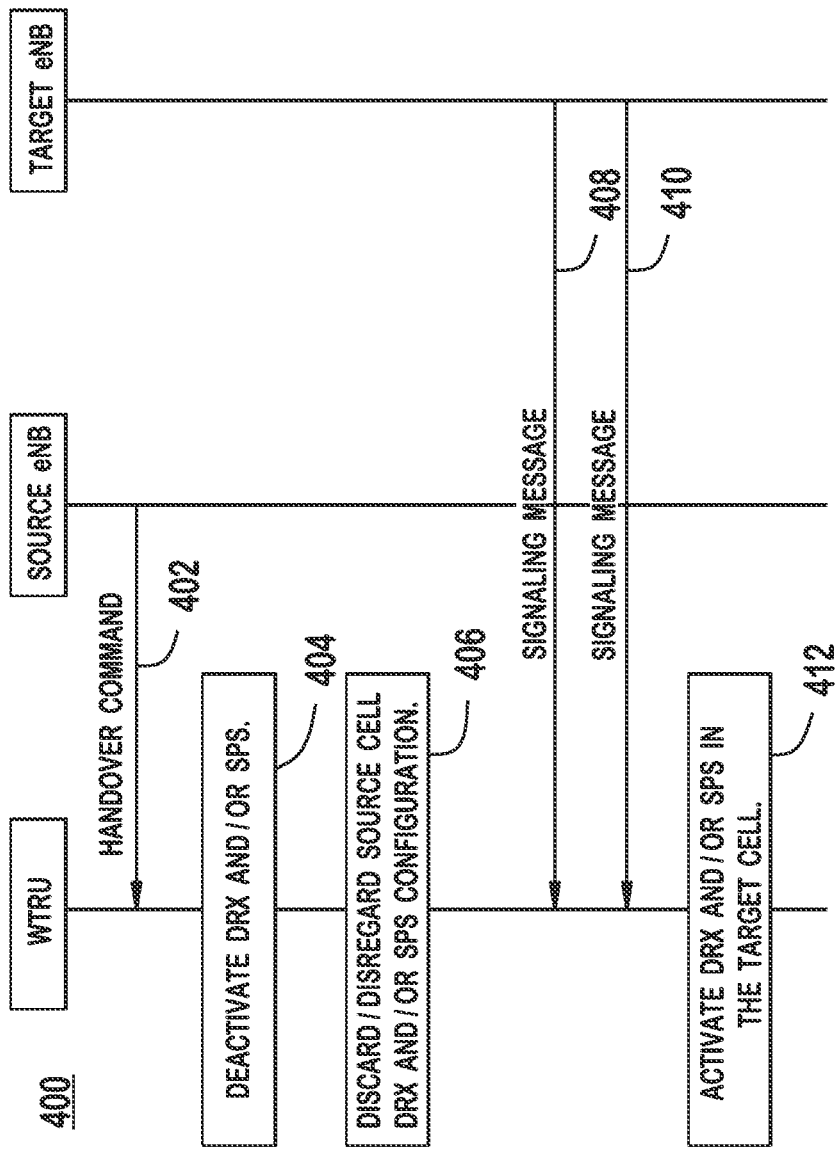
FIG. 4 is a flow diagram of an example process for performing a medium access control (MAC) reset and activating DRX and/or semi-persistent scheduling (SPS) in the target cell in accordance with the third embodiment.

FIG. 4 is a flow diagram of an example process 400 for performing a MAC reset and activating DRX and/or SPS in the target cell in accordance with the third embodiment. A WTRU receives a handover command from the source eNB and performs a MAC reset (step 402). The WTRU deactivates DRX and/or SPS upon or due to MAC reset or during the execution of the handover procedure (step 404). The WTRU discards or disregards the source cell DRX and/or SPS configurations upon or due to MAC reset (step 406). The WTRU receives a first signaling message, (e.g., an RRC message, or any L2 or L3 message), indicating the target cell DRX and/or SPS configurations directly from the target eNB in the target cell (step 408). The target eNB was made aware of the source cell DRX and/or SPS configurations for the WTRU via a signaling message sent from the source eNB to the target eNB, (e.g., in the handover request message or a subsequent message). The WTRU receives a second signaling message, (e.g., a PDCCH signal, an RRC message, or any L2 or L3 message), indicating activation of DRX and/or SPS, or when to activate DRX and/or SPS, directly from the target eNB in the target cell (step 410). The first and the second signaling messages may be sent simultaneously or separately, or may be combined in one message. The WTRU then activates DRX and/or SPS in the target cell in accordance with the target cell configuration and activation information (step 412).

The target cell DRX and/or SPS configuration provided in the first signaling message may be interpreted in a following way. The absence of a DRX and/or SPS configuration IE in the first signaling message is interpreted by the WTRU as an indication to preserve and continue with the existing DRX and/or SPS configurations. The presence of a DRX and/or SPS configuration IE in the first signaling message is interpreted by the WTRU to reconfigure its DRX and/or SPS configurations in accordance with the configuration included in the first signaling message. An indication bit may be included in the first signaling message to indicate to the WTRU whether the WTRU should preserve and continue with the existing DRX and/or SPS configurations or disregard the existing configuration.

Instead of receiving the target cell DRX and/or SPS configurations via the first signaling message from the target eNB, the target cell DRX and/or SPS configurations may be received via the handover command. In the handover command's transparent container sent from the target eNB to the source eNB, the target eNB indicates the DRX and/or SPS configurations. The target eNB was made aware of the source eNB DRX and/or SPS configurations via a signaling message sent from the source eNB to the target eNB, (e.g., in the handover request message or in a subsequent message). The absence of a DRX and/or SPS configuration IE in the handover command is interpreted by the WTRU as an indication to preserve and continue with the existing DRX and/or SPS configurations and the presence of the DRX and/or SPS configuration IE in the handover command is interpreted by the WTRU to reconfigure its DRX and/or SPS configurations in accordance with the included configuration parameters. An indication bit may be included in the handover command to indicate to the WTRU whether the WTRU should preserve and continue with the existing DRX and/or SPS configurations, or disregard the existing configuration.

The WTRU may decide when to activate DRX and/or SPS, (e.g., at or after a specific time or SFN), based on a pre-defined criteria, instead of the second signaling message from the target eNB.

It should be noted that the example process described in FIG. 4 mention both DRX and SPS together (in order to avoid text repetition), but it may be applied separately to the DRX independent of SPS, to the uplink SPS independent of DRX and downlink SPS, to downlink SPS independent of DRX or uplink SPS, or to any other functions.

Figure 5:
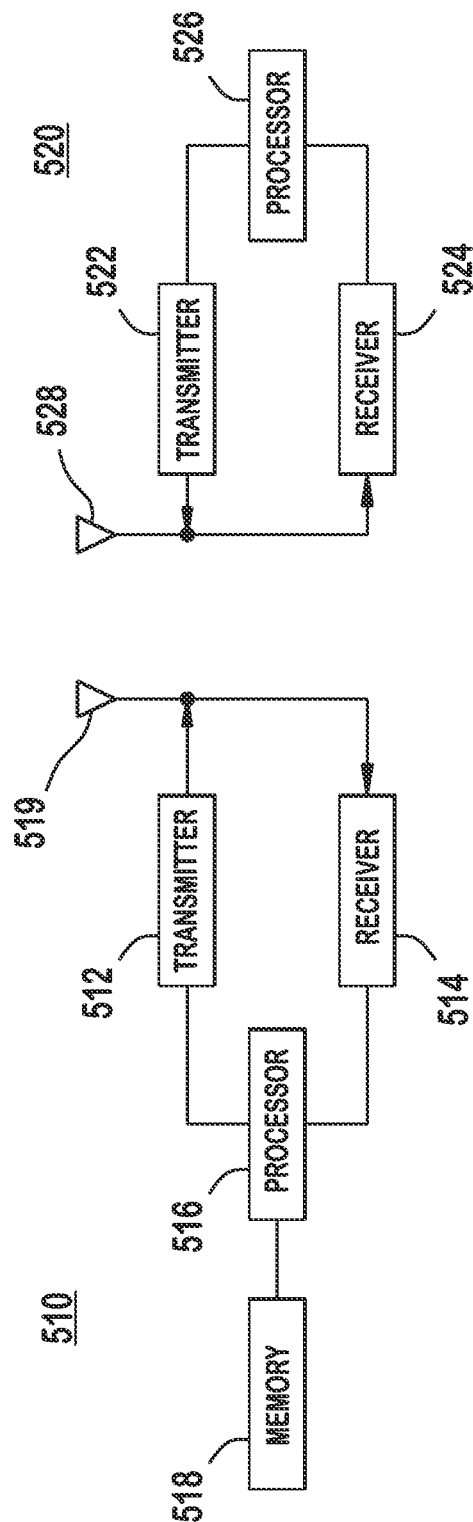
FIG. 5 is a block diagram of an example WTRU and an example eNB.

FIG. 5 is a block diagram of an example WTRU 510 and an eNB 520. The WTRU 510 is in communication with the eNB 520 and both are configured to perform a method of performing a handover in an E-UTRAN. In addition to the components that may be found in a typical WTRU, the WTRU 510 includes a transmitter 512, a receiver 514, and a processor 516, a memory 518 and an antenna 519. The memory 518 is provided to store software including operating system, application, etc. The processor 516 is provided to perform, alone or in association with the software, a method of performing a handover in accordance with one of the embodiments disclosed above. The transmitter 512 and the receiver 514 are in communication with the processor 516. The antenna 519 is in communication with both the transmitter 512 and the receiver 514 to facilitate the transmission and reception of wireless data.

In addition to the components that may be found in a typical eNB, the eNB 520 includes a transmitter 522, a receiver 524, a processor 526, and an antenna 528. The processor 526 is provided to perform a method of performing a handover in accordance with one of the embodiments disclosed above. The transmitter 522 and the receiver 524 are in communication with the processor 526. The antenna 528 is in communication with both the receiver 524 and the transmitter 522 to facilitate the transmission and reception of wireless data.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method implemented in a wireless transmit/receive unit (WTRU) for performing a handover from a source cell to a target cell, the method comprising:

initiating reception of a primary broadcast channel (P-BCH) of the target cell after receiving a handover command from an evolved Node B (eNB) associated with the source cell;

sending a random access preamble to an eNB associated with the target cell, the random access preamble being sent using a contention-based random access channel (RACH) procedure on condition that no dedicated RACH preamble is indicated in the handover command;

applying a first mode of operation prior to acquiring a system frame number (SFN) of the target cell, wherein the first mode of operation utilizes a configuration that refrains from utilizing the SFN of the target cell; and applying a second mode of operation upon acquiring the SFN of the target cell, wherein the second mode of operation utilizes a configuration that takes into account the SFN of the target cell.

2. The method of claim 1, wherein the sending the random access preamble further includes using a contention-free RACH procedure on condition that a dedicated RACH preamble is indicated in the handover command.

3. The method of claim 1, further comprising resetting medium access control (MAC) in response to receiving the handover command.

4. The method of claim 1, wherein applying the first mode of operation includes refraining from using discontinuous reception (DRX) operation in the target cell.

5. The method of claim 1, wherein applying the first mode of operation comprises refraining from using Layer 1 (L1) feedback in the target cell.

6. The method of claim 1, wherein applying the first mode of operation comprises refraining from using semi-persistent scheduling (SPS) in the target cell.

7. The method of claim 4, wherein applying the second mode of operation comprises enabling the DRX operation in the target cell.

8. The method of claim 5, wherein applying the second mode of operation comprises enabling the L1 feedback in the target cell.

9. The method of claim 6, wherein applying the second mode of operation comprises enabling the SPS in the target cell.

10. The method of claim 1, further comprising: initiating a radio link recovery procedure on condition that the SFN of the target cell is not acquired after a pre-determined period of time.

11. A wireless transmit/receive unit (WTRU) comprising a processor the processor configured at least to:
   initiate reception of a primary broadcast channel (P-BCH) of a target cell after receiving a handover command from an evolved Node B (eNB) associated with a source cell;
   a transceiver, the transceiver configured at least to:
   send a random access preamble to an eNB associated with the target cell, the random access preamble being sent using a contention-based random access channel (RACH) procedure on condition that no dedicated RACH preamble is indicated in the handover command, the processor being further configured to:
   apply a first mode of operation prior to acquiring a system frame number (SFN) of the target cell, wherein the first mode of operation utilizes a configuration that refrains from utilizing the SFN of the target cell; and
   apply a second mode of operation upon acquiring the SFN of the target cell, wherein the second mode of operation utilizes a configuration that takes into account the SFN of the target cell.

12. The WTRU of claim 11, wherein the transceiver is further configured such that the sending the random access preamble includes using a contention-free RACH procedure on condition that a dedicated RACH preamble is indicated in the handover command.

13. The WTRU of claim 11, wherein the processor is further configured to reset medium access control (MAC) in response to receiving the handover command.

14. The WTRU of claim 11, wherein the processor is further configured to apply the first mode of operation by refraining from using discontinuous reception (DRX) operation in the target cell.

15. The WTRU of claim 11, wherein the processor is further configured to apply the first mode of operation by refraining from using Layer 1 (L1) feedback in the target cell.

16. The WTRU of claim 11, wherein the processor is further configured to apply the first mode of operation by refraining from using semi-persistent scheduling (SPS) in the target cell.

17. The WTRU of claim 14, wherein the processor is further configured to apply the second mode of operation by enabling the DRX operation in the target cell.

18. The WTRU of claim 15, wherein the processor is further configured to apply the second mode of operation by enabling the L1 feedback in the target cell.

19. The WTRU of claim 16, wherein the processor is further configured to apply the second mode of operation by enabling the SPS in the target cell.

20. The WTRU of claim 11, wherein the processor is further configured to: initiate a radio link recovery procedure on condition that the SFN of the target cell is not acquired after a pre-determined period of time.

* * * * *

UNITED STATES PATENT AND TRADEMARK OFFICE
CERTIFICATE OF CORRECTION

PATENT NO. : 9,497,671 B2  
APPLICATION NO. : 14/664829  
DATED : November 15, 2016  
INVENTOR(S) : Peter S. Wang et al.

Page 1 of 1

It is certified that error appears in the above-identified patent and that said Letters Patent is hereby corrected as shown below:

In the Claims

Column 9, Line 29 Claim 11: after "a processor" insert --,--
Column 9, Line 33 Claim 11: after "source cell;" insert --and--

Signed and Sealed this
Third Day of January, 2017

Michelle K. Lee
*Director of the United States Patent and Trademark Office*